W. H. STROM.
BALL BEARING.
APPLICATION FILED JULY 22, 1914.
1,135,558.
Patented Apr. 13, 1915.
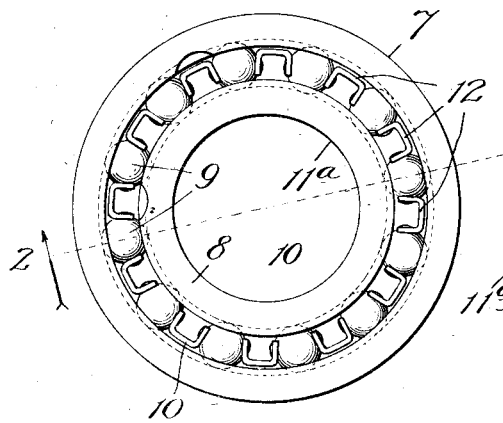
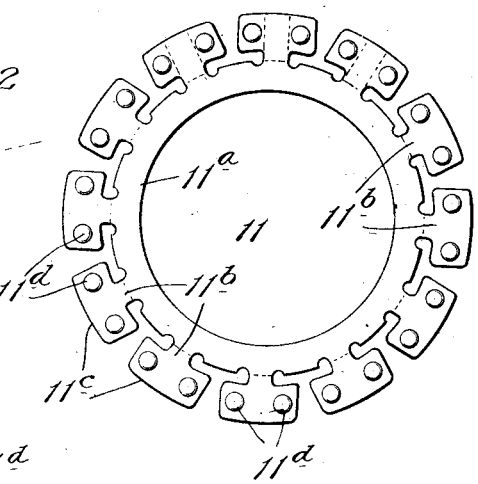
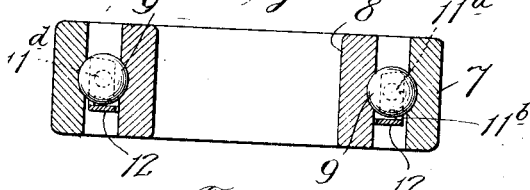
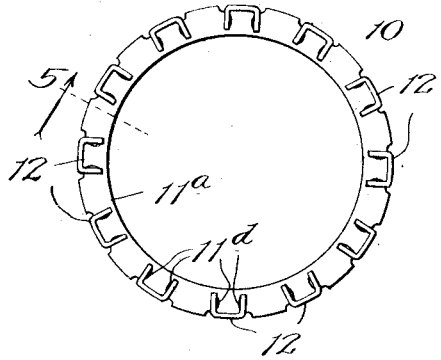
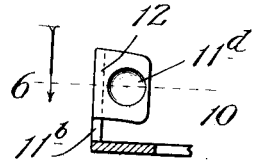
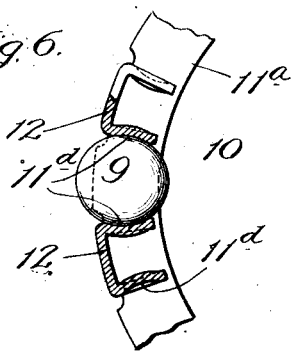
Witnesses:
Inventor:
Walter H. Strom,
By Danforth, Lee, Chitton and Wiles,
Attys.

UNITED STATES PATENT OFFICE.

WALTER H. STROM, OF OAK PARK, ILLINOIS.

BALL-BEARING.

1,135,558.  Specification of Letters Patent.  Patented Apr. 13, 1915.

Application filed July 22, 1914. Serial No. 852,333.

*To all whom it may concern:*

Be it known that I, WALTER H. STROM, a citizen of the United States, residing at Oak Park, in the county of Cook and State of Illinois, have invented a new and useful Improvement in Ball-Bearings, of which the following is a specification.

My invention relates to an improvement in the type of ball-bearings in which the balls run in a race formed of opposing circular grooves provided, respectively, about the inner face of an outer ring and the outer face of an inner ring concentric with the outer ring, and in which an annular retainer in the space between the two rings serves to hold the balls in properly spaced relation.

The present invention relates, particularly, to the construction of the retainer element for obtaining the advantages hereinafter pointed out.

In the accompanying drawing, Figure 1 is a plan view of a ball-bearing embodying my improvement; Fig. 2 is a section on line 2, Fig. 1; Fig. 3 is a plan view of the retainer; Fig. 4 is a plan view of a blank, showing it as it is stamped out to be formed by another stamping operation into the retainer; Fig. 5 is an enlarged broken section on line 5, Fig. 3, and Fig. 6 is an enlarged broken view, partly in section taken on line 6, Fig. 5, and partly in elevation.

The ball-bearing shown comprises, as usual, an outer ring 7 containing an inner circumferential groove, an inner ring 8 containing an outer circumferential groove to coöperate with the companion-groove in forming the ball-race, balls 9 confined in the race, and a retainer 10 insertible into the space between the rings to keep the balls apart.

The retainer is formed by stamping a blank 11 (Fig. 4) out of suitable sheet-metal to provide a ring-section 11$^a$ having T-shaped projections extending radially, at uniform intervals, from its periphery and each having a relatively narrow neck or stem 11$^b$ and a relatively wide head 11$^c$, in one face of which are provided, near its ends, depressions 11$^d$. This blank may be cut out by one operation of suitable dies, though it is the present practice to produce the depressions by a second operation. The blank is then subjected to other dies to bend the necks 11$^b$ at right-angles to the ring 11$^a$ and fold the end portions of the heads 11 into members of substantial U-shape but with converging sides, the depressions being in the outer surfaces of these sides. The radial projections thus folded form spacers or distance-pieces 12 for the balls and are flexible to yield inwardly and outwardly at the necks 11$^b$ and also at the sides containing the depressions.

The retainer is introduced into place after the two rings 7 and 8 and balls have been assembled; and in inserting it between the rings the spacers enter between successive balls to hold them in separate relation, each ball finding its bearings at diametrically opposite points in opposing depressions 11$^d$.

In forming the retainer, it is practically impossible to prevent irregularity of the spacers in their setting with relation to the ring 11$^a$. That is to say, some of them will extend inwardly toward the inner periphery of the ring farther than others, thereby bringing opposite depressions 11$^d$ out of line with each other, whereas they should meet the respective balls at diametrically opposite points. In that condition of the retainer, the bearing points of those balls between irregularly projecting spaces would not be diametrically opposite each other; and if the spacers were rigid (as they would be if formed separately from the ring and riveted in place, instead of being formed integrally therewith through the medium of the flexible necks) the balls in rotating would grind against them more or less noisily, causing wear, and tend to bind.

The flexible spacers in my improved construction enable any ball, when adjacent spacers are out of line, in the sense referred to, to strain the latter into relative positions wherein the ball finds its bearings at diametrically opposite points in the opposing depressions. Moreover, and particularly in the bearings of larger sizes, where the spacers project thus irregularly to a more or less great extent, they may be readily bent by hand, or with a suitable tool, to right them approximately, so that the balls may more readily find their bearings at the desirable diametrically opposite points after the retainer is introduced into place. The described flexibility of the spacers also comes into play where the race-forming grooves in the concentric rings differ in depth. This is liable to occur where a bearing is repaired by regrinding the rings, and the same condition may also exist in a new bearing, whereby the balls will be housed to a slightly greater extent in one groove than within another, and will not register at diametrically opposite points with the retainer depressions even though the spacers be uniformly set properly on the ring 11ª. In such a case, also, the flexibility of the spacers enables the balls between them to bring them into proper relative position to embrace the balls at diametrically opposite points between the depressions. Furthermore, the flexibility of the spacers saves much manipulation in assembling the parts of the bearing and facilities and greatly reduces the cost of assembling the parts of the bearing. In fact it reduces that cost by about 90 per cent.

What I claim as new and desire to secure by Letters Patent is:—

1. A ball-bearing ball-retainer, comprising a sheet-metal ring having ball-spacers at intervals about its outer edge, comprising flexible necks extending at substantial right-angles to the ring and terminating in members having sides folded toward each other to extend toward the inner peripheral edge of the ring.

2. A ball-bearing ball-retainer, comprising a sheet-metal ring having ball-spacers at intervals about its outer edge, comprising flexible necks extending at substantial right-angles to the ring and terminating in members having sides folded toward each other to extend to the inner peripheral edge of the ring, and provided with depressions in their outer faces.

3. A ball-bearing ball-retainer, comprising a sheet-metal ring having ball-spacers at intervals about its outer edge, comprising flexible necks extending at substantial right-angles to the ring and terminating in members having sides folded convergingly toward each other to extend toward the inner peripheral edge of the ring, and provided with depressions in their outer faces.

WALTER H. STROM.

In presence of—
A. C. FISCHER,
L. HEISLAR.